(12) United States Patent
Koyama (10) Patent No.: US 8,075,206 B2
(45) Date of Patent: Dec. 13, 2011

(54) LENS BARREL, CAMERA, PORTABLE DATA TERMINAL EQUIPMENT, IMAGE INPUT EQUIPMENT, AND CYLINDER FOR LENS BARREL

(75) Inventor: Terunori Koyama, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/746,439

(22) PCT Filed: Dec. 17, 2008

(86) PCT No.: PCT/JP2008/073498
§ 371 (c)(1),
(2), (4) Date: Jun. 4, 2010

(87) PCT Pub. No.: WO2009/078491
PCT Pub. Date: Jun. 25, 2009

(65) Prior Publication Data
US 2010/0247092 A1    Sep. 30, 2010

(30) Foreign Application Priority Data

Dec. 18, 2007  (JP) .................................. 2007-325957
Sep. 29, 2008  (JP) .................................. 2008-251520

(51) Int. Cl.
*G03B 17/00*  (2006.01)
*G03B 5/02*   (2006.01)
*G02B 15/14*  (2006.01)

(52) U.S. Cl. ........ 396/529; 396/349; 396/533; 359/700; 359/704

(58) Field of Classification Search .................. 396/529, 396/85, 348, 349, 531, 533; 348/240.99, 348/240.3; 359/699, 700, 701, 704
See application file for complete search history.

(56) References Cited

U.S. PATENT DOCUMENTS

| | | | |
|---|---|---|---|
| 6,813,093 B2 | 11/2004 | Takagi et al. | |
| 2004/0051970 A1 | 3/2004 | Nomura | |
| 2004/0228006 A1 | 11/2004 | Yasutomi et al. | |
| 2006/0115262 A1* | 6/2006 | Nomura | ........................ 396/349 |

(Continued)

FOREIGN PATENT DOCUMENTS

JP         9-211292 A       8/1997

(Continued)

*Primary Examiner* — Rochelle-Ann J Blackman
(74) *Attorney, Agent, or Firm* — Dickstein Shapiro LLP (57) ABSTRACT

A lens barrel includes a fixed cylinder, a first rotating cylinder, a linear movement cylinder which moves integrally in an axis direction with the first rotating cylinder, and a second rotating cylinder. The linear movement cylinder has equal to or more than three projections in an outer circumferential surface. The first rotating cylinder has equal to or more than three cutouts corresponding to each projection of the linear movement cylinder in an inner circumferential surface, and each cutout has a shape corresponding to a shape of each projection. Each cutout is formed in parallel with an axis of the first rotating cylinder, and in which each projections of the linear movement cylinder is inserted. An end of each cutout extends to a groove in a circumferential direction, each projection is guided in the groove, and the first rotating cylinder and the linear movement cylinder is connected. The linear movement cylinder has a through-hole corresponding to a pin provided in the second rotating cylinder, and at least two of the equal to or more than three projections are provided in an area in a circumferential wall of the linear movement cylinder where the through-hole is not formed in the circumferential direction.

15 Claims, 8 Drawing Sheets

U.S. PATENT DOCUMENTS

2006/0209192 A1 9/2006 Shinohara et al.
2008/0007847 A1 1/2008 Koyama

FOREIGN PATENT DOCUMENTS

| JP | 11-183771 A | 7/1999 |
| JP | 2003-255212 A | 9/2003 |
| JP | 2003-322786 A | 11/2003 |
| JP | 2004-258635 A | 9/2004 |
| JP | 2009-69290 A | 4/2009 |

* cited by examiner

LENS BARREL, CAMERA, PORTABLE DATA TERMINAL EQUIPMENT, IMAGE INPUT EQUIPMENT, AND CYLINDER FOR LENS BARREL

TECHNICAL FIELD

The present invention relates to a lens barrel, a camera, portable data terminal equipment, image input equipment and a cylinder for a lens barrel.

BACKGROUND ART

A lens barrel for holding a shooting lens of a camera and so on, in a state of being attached to a camera body, or in a state of not being attached to the camera body as a lens barrel for a single-lens reflex camera, often receives a great shock when dropped mistakenly or hit by an object.

There are various systems for a lens drive mechanism of the lens barrel. One of the various systems adopted in the lens drive mechanism is a so-called Bayonet connection, in which members in a cylindrical shape are connected by fitting a projection to a cutout and a groove in a circumferential direction, and move relatively to each other. In a case of using the lens barrel adopted in the Bayonet connection, and in a case where the projection is placed in a part which is mechanistically low in strength of a member in the cylindrical shape, when the lens barrel receives a great shock as described above, the member in the cylindrical shape may be deformed and the Bayonet connection may come off. Therefore, there are problems such that the lens barrel does not move smoothly, or does not even move at all.

The reasons for occurrence of such problems described above will be explained more specifically. As for the members in the cylindrical shape, in a linear movement groove formed in one of the members in the cylindrical shape, the projection of the other member is fitted, and the members in the cylindrical shape move relatively to each other in a center axis direction. Additionally, the projection is led into a groove in a circumferential direction extending to the linear movement groove, and the members in the cylindrical shape are connected to each other and rotate relatively to each other around the center axis. A connection where the projection and the groove are fitted together is generally called a "Bayonet connection". A member with the projection described above often has a clearance groove to a pin to move a lens frame in an optical axis direction when zooming and so on, or a cam groove etc. in a wide range in the circumferential direction. In a case where the clearance groove or the cam groove etc. described above are formed in the member, the strength of the members in the cylindrical shape is degraded. Especially, in the axis direction, in a range where the clearance groove or the cam groove etc. are provided along, the strength tends not to be enough. Therefore, in a case where the projection is provided in this range, when a shock is received, it is easy for the member with the projection to be deformed in a periphery of the projection and it is easy for the projection to come off the groove. That is, it is easy for the Bayonet connection to come off.

It is considered that by enlarging a width of the projection, that is, enlarging a length in the circumferential direction centering on an axis of the members in the cylindrical shape, it is more difficult for the Bayonet connection to come off. However, only enlarging the width of the projection slightly is minimally-effective. If the width of the projection is enlarged greatly, it is more effective in terms of mechanical strength. However, a degree of parallelization of a front side and a back side of the projection in the circumferential direction of the members in the cylindrical shape needs to be processed with high accuracy, therefore it is difficult to manufacture.

There is a Bayonet connection in which a depth of the projection fitting in the groove is deeper, so that it is difficult for the Bayonet connection to come off. Or the members in the cylindrical shape are produced from an aluminum alloy bar by a cutting work and thereby the mechanical strength is enhanced, so that the members in the cylindrical shape are not deformed even if a shock is received. By being structured as described above, it is possible to prevent the Bayonet connection from coming off, even if the members in the cylindrical shape are deformed by the shock, and this also makes it possible to decrease a deformation of the members in the cylindrical shape.

However, in a method in which a fitting part of the Bayonet connection is deeper, a thickness in a radial direction of a member having the fitting part needs to be very thick. Therefore, there is a problem that a diameter of the lens barrel may become larger. And, in a case where a lens barrel is produced from the aluminum alloy bar by the cutting work, the long production time is increased and causing a problem of low productivity. Moreover, compared with members in the cylindrical shape produced from a synthetic resin, there is a problem that a front end slants downward in a state where the members in the cylindrical shape produced from the aluminum alloy bar are extended because of its heavy weight.

As a known example of enhancing the strength of the lens barrel described above, there is Japanese patent publication number 2003-322786. Japanese patent publication number 2003-322786 discloses an invention in which a reinforcing member is used to enhance the strength of the lens barrel.

DISCLOSURE OF THE INVENTION

However, in the invention of Japanese patent publication number 2003-322786, by use of the reinforcing member, there are problems that the structure becomes complex, the weight becomes heavier, and the cost increases.

An object of the present invention is to provide a lens barrel capable of enhancing the strength of the Bayonet connection. In addition, another object of the present invention is to provide a camera, a portable data terminal equipment, and image input equipment having the lens barrel described above, and a cylinder for the lens barrel.

In order to achieve the above objects, the present invention provides a lens barrel comprising: a fixed cylinder; a first rotating cylinder which is placed to be rotatable around an axis to the fixed cylinder; a linear movement cylinder in a cylindrical shape which is placed in an inner circumferential side of the first rotating cylinder and moves integrally in an axis direction with the first rotating cylinder and rotates relatively around the axis; and a second rotating cylinder which is placed in an inner circumferential side of the linear movement cylinder, wherein the linear movement cylinder has equal to or more than three projections which are projected outside in a radius direction in an outer circumferential surface, the first rotating cylinder has equal to or more than three cutouts corresponding to each projection of the linear movement cylinder and a shape of the cutouts corresponding to a shape of each projection in the inner circumferential surface, and the equal to more than three cutouts of the first rotating cylinder are respectively formed in parallel with an axis of the first rotating cylinder and in which each projection of the linear movement cylinder is inserted, an end of each cutout in which each projection is inserted is extended to a groove in a circumferential direction, in this groove in the circumferential direction, each projection is guided, and the first rotating cylinder and the linear movement cylinder are connected, and the linear movement cylinder has a through-hole to a pin provided in the second rotating cylinder, and at least two of the equal to more than three projections are placed in an area in a circumferential wall of the linear movement cylinder where the through-hole is not formed in the circumferential direction.

Preferably, a height of the equal to or more than three projections which the linear movement cylinder has is the same.

Preferably, the lens barrel is a retractable lens barrel, wherein the first rotating cylinder, the linear movement cylinder, and the second rotating cylinder are collapsed in an inner circumference of the fixed cylinder, and a position, where each projection is guided in the groove in the circumferential direction and the first rotating cylinder and the linear movement cylinder rotate relatively by a predetermined angle, is taken as an assembling position.

Preferably, a position where the first rotating cylinder and the linear movement cylinder rotate relatively by a predetermined angle from the assembling position is a collapsed position where the first rotating cylinder, the linear movement cylinder, and the second rotating cylinder are collapsed in an inner circumference of the fixed cylinder, and the first rotating cylinder and the linear movement cylinder relatively rotate further, and thereby a position where the first rotating cylinder, the linear movement cylinder, and the second rotating cylinder are extended forward from the fixed cylinder is a shooting position.

Preferably, the shooting position is continuously changeable in a range of the closest shooting position to the most distant shooting position from the collapsed position by a relative rotation of the first rotating cylinder and the linear movement cylinder.

Preferably, when a relative rotation angle of the first rotating cylinder and the linear movement cylinder from the assembling position of the first rotating cylinder and the linear movement cylinder to the collapsed position is taken as $\alpha$, a relative rotation angle of the first rotating cylinder and the linear movement cylinder from the collapsed position to the closest shooting position is taken as $\beta$, a relative rotation angle of the first rotating cylinder and the linear movement cylinder from the closest shooting position to the most distant shooting position is taken as $\gamma$, a first projection and a second projection of the equal to or more than three projection are placed in the circumferential direction at approximately 180 degree, a third projection having a smaller width in the circumferential direction than those of the first projection and the second projection of the equal to or more than three projections is placed in a position which is shifted by an angle which is less than $\alpha+\beta$ degrees from the first projection in a rotational direction of the first rotating cylinder.

Preferably, a fourth projection having a smaller width in the circumferential direction than that of the first projection is placed in a position which is shifted by an angle which is equal to or more than $\alpha+\beta+\gamma$ degrees from the second projection in the rotational direction of the first rotating cylinder.

Preferably, the pin provided in the second rotating cylinder penetrates the through-hole provided in the linear movement cylinder, engages with a linear movement groove formed in the inner circumference of the first rotating cylinder, and transmits a torque of the first rotating cylinder to the second rotating cylinder.

In addition, the invention provides a camera comprising: a shooting lens, wherein a lens barrel of the shooting lens is the lens barrel according to any one of those described above.

The invention also provides portable data terminal equipment comprising: a camera, wherein a lens barrel of the shooting lens of the camera is the lens barrel according to any one of those described above.

The invention provides image input equipment comprising: a shooting lens, which converts the image data imaged by the shooting lens into an electric signal and inputs, wherein a lens barrel of the shooting lens is the lens barrel according to any one of the described above.

The invention provides a cylinder for a lens barrel structured by fitting in a first circular cylinder, the cylinder comprising: equal to or more than three projections which are projected toward the outside in a radius direction in an outer circumferential surface and a through-hole to a pin provided in a second cylinder, and at least two projections of the equal to or more than three projections are placed in an area in a circumferential wall of the cylinder where the through-hole is not formed in the circumferential direction.

BRIEF DESCRIPTION OF THE DRAWINGS

The accompanying drawings are included to provide a further understanding of the invention, and are incorporated in and constitute a part of this description. The drawings illustrate embodiments of the invention, and together with the description, serve to explain the principle of the invention.

DESCRIPTION OF NUMERALS 1 fixed cylinder
2 first rotating cylinder 3 linear movement cylinder
4 second rotating cylinder
5 base member
11 helicoid
12 linear movement groove
21 first cutout
22 second cutout
23 third cutout
24 fourth cutout
25 groove in circumferential direction
26 linear movement groove
28 helicoid
29 rack
31 first projection
32 second projection
33 third projection
34 fourth projection
36 through-hole
37 helicoid
38 projection
42 pin
43 helicoid
44 cam groove

BEST MODE FOR CARRYING OUT THE INVENTION

Figure 3:
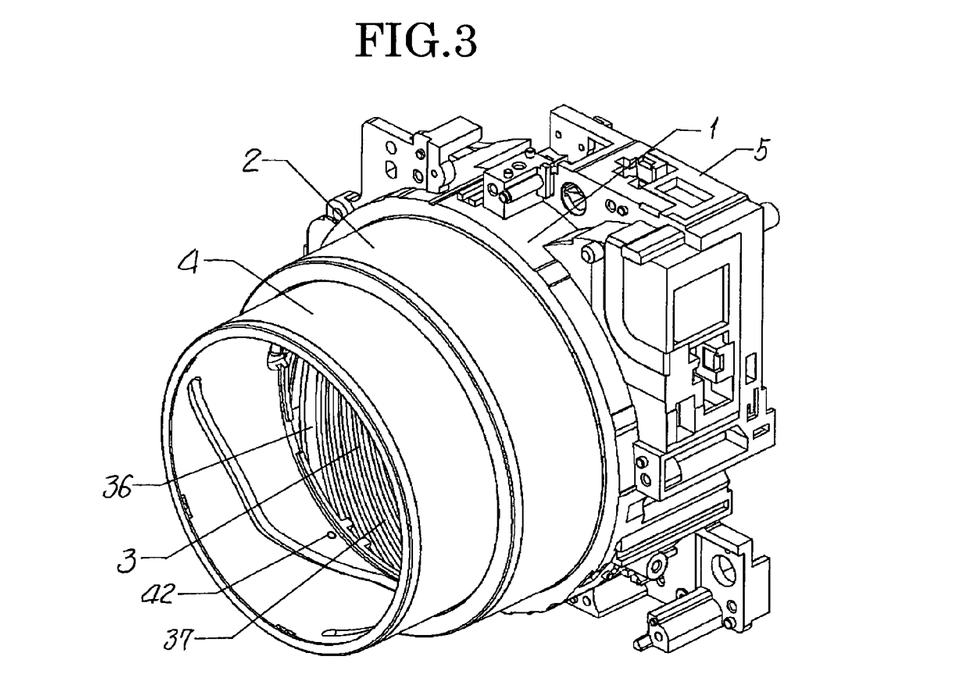
FIG. 3 is a perspective view of a second shooting state of the embodiment described above.
Figure 4:
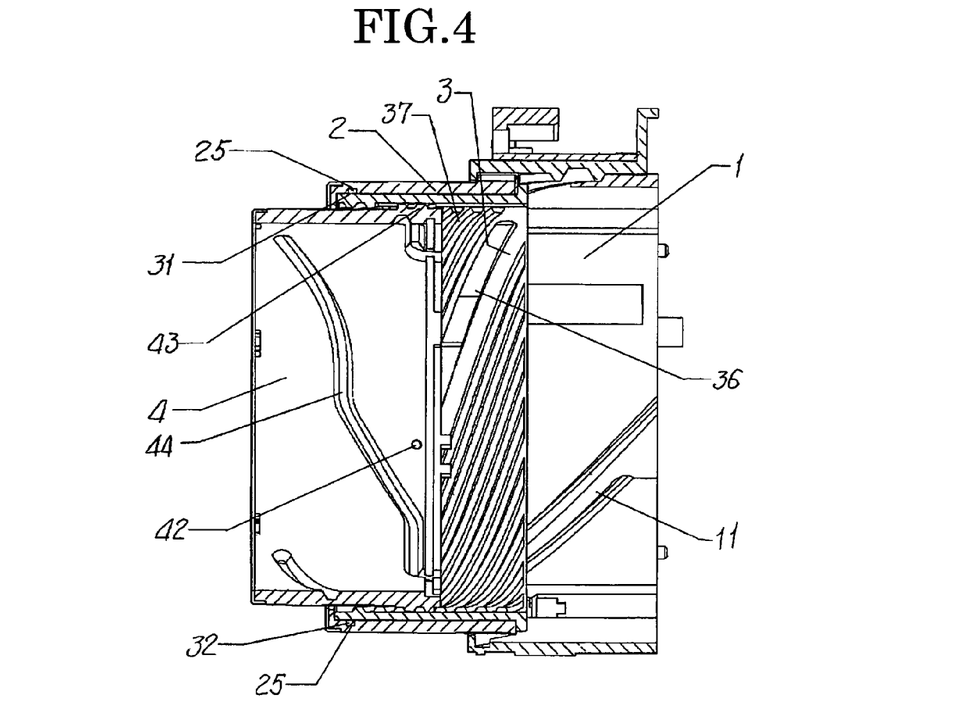
FIG. 4 is a longitudinal section view of the first shooting state of the embodiment described above.
Figure 5:
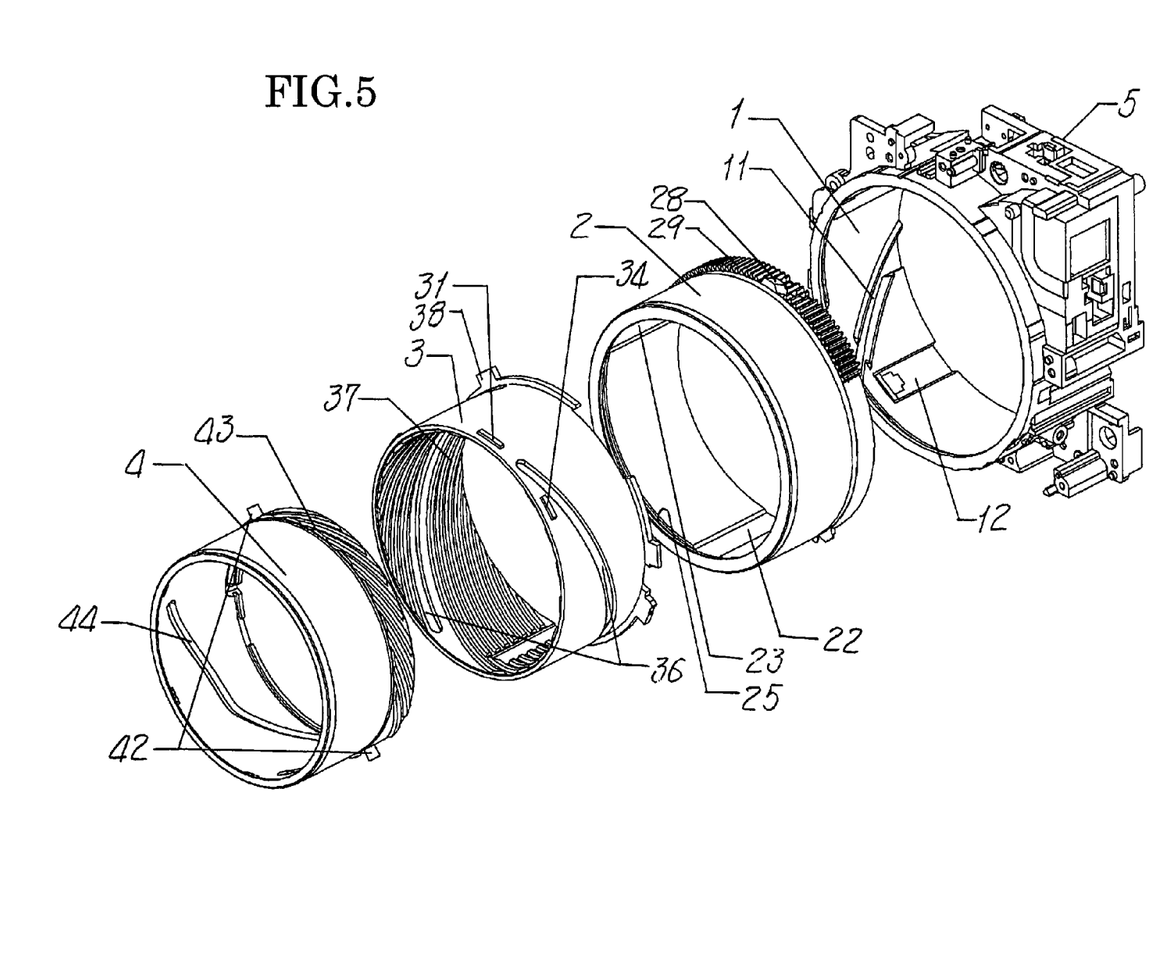
FIG. 5 is an exploded perspective view of the embodiment described above.

In FIGS. 1 to 5, numeral 5 denotes a base member of a lens barrel. The base member 5 comprises a fixed cylinder 1. In an inner circumferential side of the fixed cylinder 1, a first rotating cylinder 2 is fitted. In an inner circumferential side of the first rotating cylinder 2, a linear movement cylinder 3 in a cylindrical shape is fitted from a back end (a right end in FIG. 4) of the first rotating cylinder 2. The fixed cylinder 1 and the linear movement cylinder 3 are connected by a so-called "Bayonet connection", which is described in detail later. In an inner circumferential surface of the fixed cylinder 1, a female helicoid 11 in which a pitch is comparatively large is formed, and a plurality of linear movement grooves 12 is formed individually in parallel with a center axis. In the helicoid 11, a male helicoid 28 which is formed projected toward an outer circumference of the back end of the first rotating cylinder 2 is fitted. A plurality of the helicoids 28, which is in a very short projected shape as illustrated in FIG. 5, is individually formed in a circumferential direction of the first rotating cylinder 2.

In the outer circumference of the back end of the first rotating cylinder 2, a rack 29 is formed to surround the helicoids 28 in the circumferential direction. This rack 29 engages with a pinion (not illustrated) which is driven by a motor. Therefore, when the pinion is rotationally driven by the motor, the male helicoid 28 is guided by the female helicoid 11, so that the first rotating cylinder 2 rotates around the center axis and moves back and forth in the center axis direction (hereinafter, it is called "optical axis direction") in the fixed cylinder 1. The pinion described above has a long length in the optical axis direction in order not to be disengaged from the rack 29 when the first rotating cylinder 2 moves back and forth.

A linear movement cylinder 3 has a plurality of projections 38, which is projected toward the outside in a radius direction, in an outer circumference of a back end. These projections 38 fit in a linear movement groove 12 of the fixed cylinder 1. Therefore, the linear movement cylinder 3 is guided by the linear movement groove 12 and linearly moves in the center axis direction. The linear movement cylinder 3 is not able to rotate around the center axis.

Figure 6:
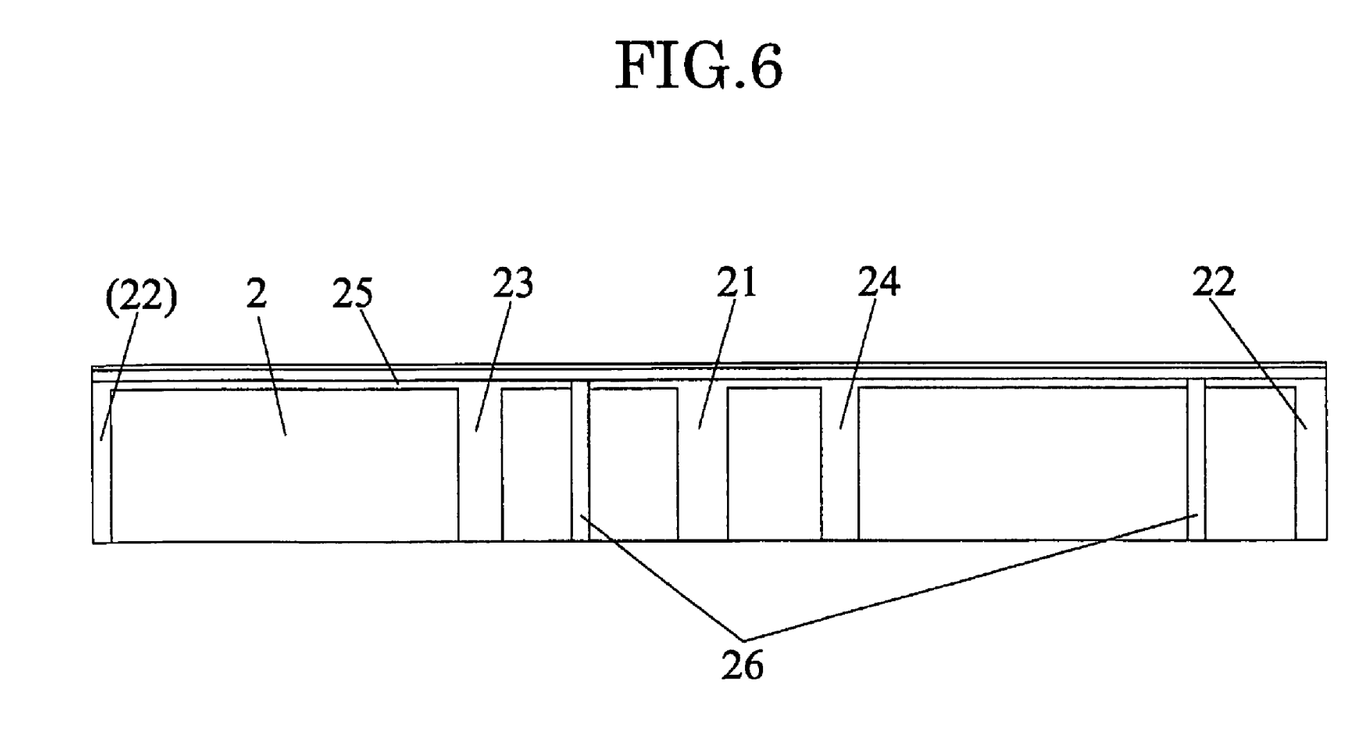
FIG. 6 is a development view of an inner circumference of a first rotating cylinder of the embodiment described above.
Figure 8:
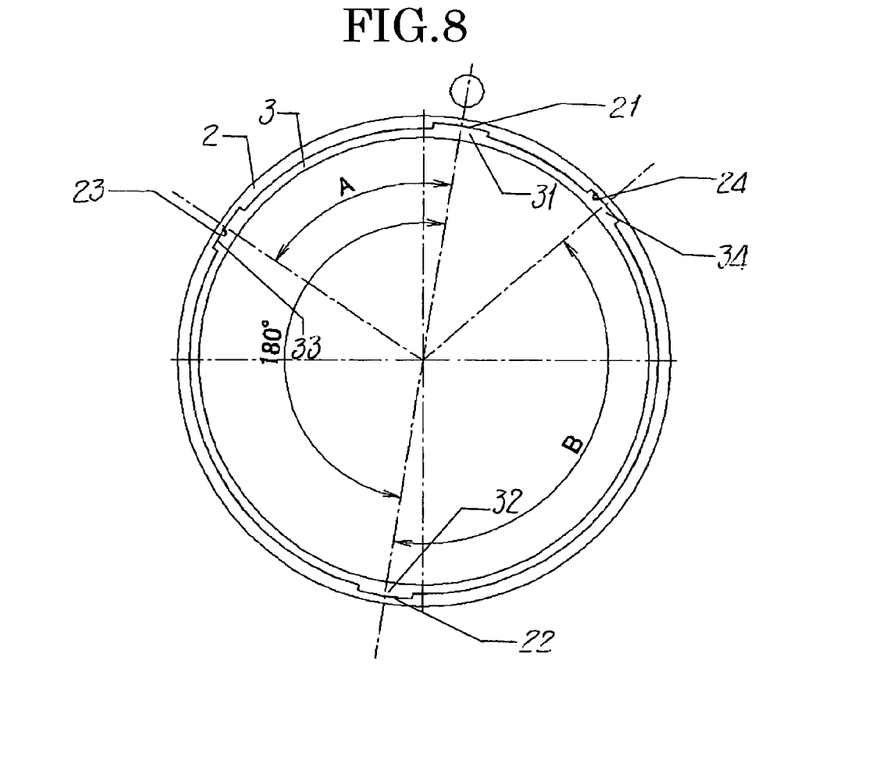
FIG. 8 is a front view illustrating a relationship of a relative position of the first rotating cylinder and the linear movement cylinder in an assembling state of the embodiment described above.

In an inner circumferential surface of the first rotating cylinder 2, a plurality of cutouts is individually formed in parallel with the optical axis. In this embodiment, as illustrated in FIGS. 6 and 8, four cutouts, a first cutout 21, a second cutout 22, a third cutout 23, and a fourth cutout 24 are formed. These cutouts 21, 22, 23, 24 are formed so as to extend to a groove 25 which is formed in the circumferential direction in a front end of the first rotating cylinder 2. Additionally, in the inner circumferential surface of the first rotating cylinder 2, two linear movement grooves 26 in which a pin 42 of the second rotating cylinder 4, which is described later, fits in are formed in parallel with the optical axis avoiding positions of the four cutouts 21, 22, 23, 24 described above.

Figure 7:
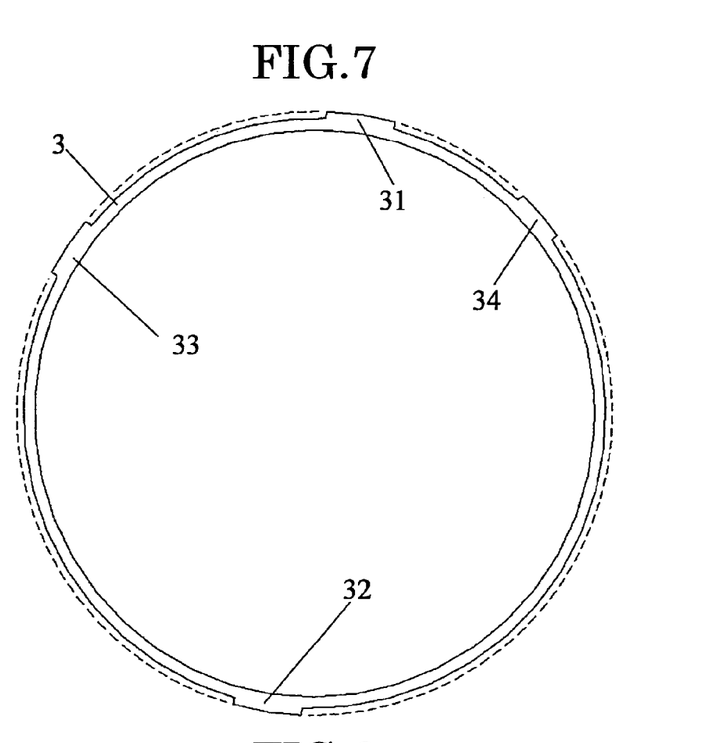
FIG. 7 is a front view of a linear movement cylinder of the embodiment described above.

In an outer circumferential surface of a front end of the linear movement cylinder 3, a first projection 31, a second projection 32, a third projection 33, and a fourth projection 34 respectively corresponding to the four cutouts 21, 22, 23, 24 described above are formed. As illustrated in FIG. 7, each height of these four projections 31, 32, 33, 34, that is, each projected length from a main body of the linear movement cylinder 3 toward the outside in the radius direction is almost the same. After the four projections 31, 32, 33, 34 described above are inserted individually in the cutouts 21, 22, 23, 24 described above provided respectively corresponding to the projections 31, 32, 33, 34, the first rotating cylinder 2 and the linear movement cylinder 3 rotate relatively around the center axis, and thereby each projection described above is guided into the groove 25 in the circumferential direction extended to a front end of each cutout described above. Therefore, each projection described above fits in the groove 25 formed in the circumferential direction, and thereby the linear movement cylinder 3 moves integrally with the first rotating cylinder 2 in the center axis direction and is rotatable relatively to the first rotating cylinder 2 around the center axis. This connection structure of this first rotating cylinder 2 and the linear movement cylinder 3 is one type of Bayonet connection structures. In an inner circumferential surface of a front end of the linear movement cylinder 3, a female helicoid 37 is formed.

In the inner circumferential surface of the first rotating cylinder 2, the second rotating cylinder 4 is fitted. As illustrated in FIG. 5, in an outer circumferential surface of a back end of the second rotating cylinder 4, a male helicoid 43 is formed. In a part of a place where this helicoid 43 is formed, an arbitrary number of pins 42 in a cylindrical shape are disposed. As illustrated in FIG. 4, the helicoid 43 described above engages with the helicoid 37 of the linear movement cylinder 3, and the pin 42 described above penetrates a through-hole 36 formed in a circumferential wall of the linear movement cylinder 3 and fits in a linear movement groove 26 (see FIG. 6) of the first rotating cylinder 2. The linear movement groove 26 transmits a torque of the first rotating cylinder 2 via the pin 42 described above to the second rotating cylinder 4 and works to move relatively the second rotating cylinder 4 in the optical axis direction to the first rotating cylinder 2. That is, when the first rotating cylinder 2 rotates around the optical axis, this torque is transmitted to the pin 42 from the linear movement groove 26 described above, and the second rotating cylinder 4 rotates around the optical axis with the first rotating cylinder 2. The second rotating cylinder 4 rotates to the linear movement cylinder 3, and thereby the second rotating cylinder 4 moves back and forth in the optical axis direction by an engagement of the helicoid 43 and the helicoid 37 of the linear movement cylinder 3. The pin 42 described above rotates and moves corresponding to pitches of the helicoids 37, 43 by a rotation of the second rotating cylinder 4, therefore the through-hole 36 described above is formed to have the same pitch as the pitches of the helicoids 37, 43 and to be somewhat wider than a diameter of the pin 42 so that the pin 42 does not interfere with the linear movement cylinder 3.

In an inner circumferential surface of the second rotating cylinder 4, an arbitrary number of cam grooves 44 is formed. In an inner circumferential side of the second rotating cylinder 4, a lens holding frame is fitted. In an inner circumferential side of the lens holding frame, a second linear movement cylinder in a cylindrical shape, which is similar to the linear movement cylinder 3, is fitted. The lens holding frame holds, for example, a first lens group, and moves in the optical direction with the first lens group by the rotation of the second rotating cylinder 4. In the inner circumferential side of the second linear movement cylinder described above, for example, a lens frame which holds a second lens group is fitted, and the second lens group is guided by an arbitrary cam groove to move in the optical axis direction with a movement in the optical axis direction of the second linear movement cylinder. However, since the main point of the present invention is not the movement mechanism of the lens frames, details are not explained here.

The lens barrel explained above is applicable to a retractable zoom lens. A movement from a collapsed state where each structural member is retracted toward an inner circumference of the fixed cylinder 1 to a photographable state where each structural member is extended from the fixed cylinder 1, and a movement from the closest shooting position (for example, a wide angle end) from the collapsed state to the most distant shooting position (for example, a telephoto end) will be explained.

When the first rotating cylinder 2 is rotationally driven by a drive of the motor described above, the helicoid 28 of the first rotating cylinder 2 is led by the helicoid 11 of the fixed cylinder 1, and the first rotating cylinder 2 moves in the optical axis direction. The linear movement cylinder 3 is fitted in the inner circumferential side of the first rotating cylinder 2, and the projection 38 of the linear movement cylinder 3 fits in the linear movement groove 12 of the fixed cylinder 1.

Additionally, as described above, the four projections 31, 32, 33, 34 fit in the groove 25 in the circumferential direction of the first rotating cylinder 2, therefore the linear movement cylinder 3 moves in the optical axis direction with a movement of the first rotating cylinder 2 in the optical direction, without rotating around the optical axis. In the linear movement groove 26 formed in an inner circumferential surface of the first rotating cylinder 2, the pin 42 disposed on the second rotating cylinder 4 and which penetrates the through-hole 36 of the linear movement cylinder 3 is fitted, therefore by a rotation of the first rotating cylinder 2, this torque is transmitted to the second rotating cylinder 4, and the second rotating cylinder 4 also rotates around the optical axis. When the second rotating cylinder 4 rotates, the second rotating cylinder 4 moves back and forth by an engagement of the helicoid 43 of the second rotating cylinder 4 and the helicoid 37 of the linear movement cylinder 3.

Figure 1:
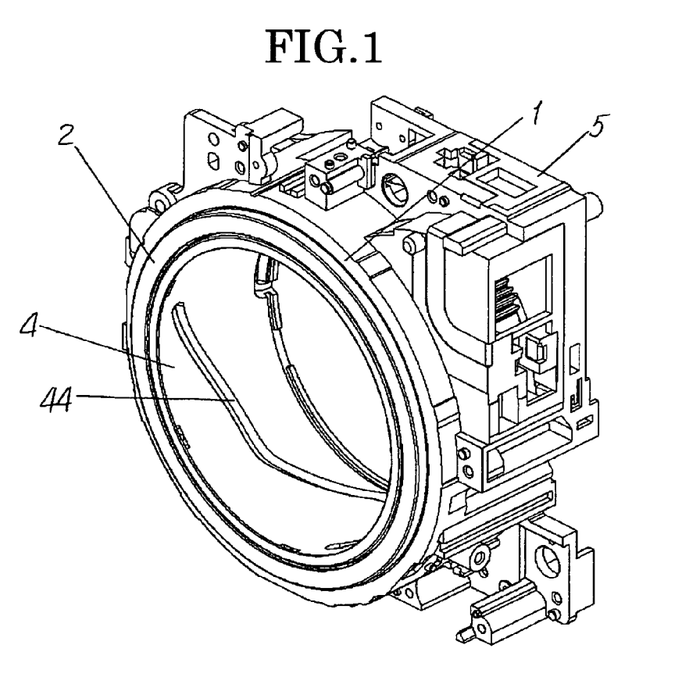
FIG. 1 is a perspective view of a collapsed state of a lens barrel according to an embodiment of the present invention.
Figure 2:
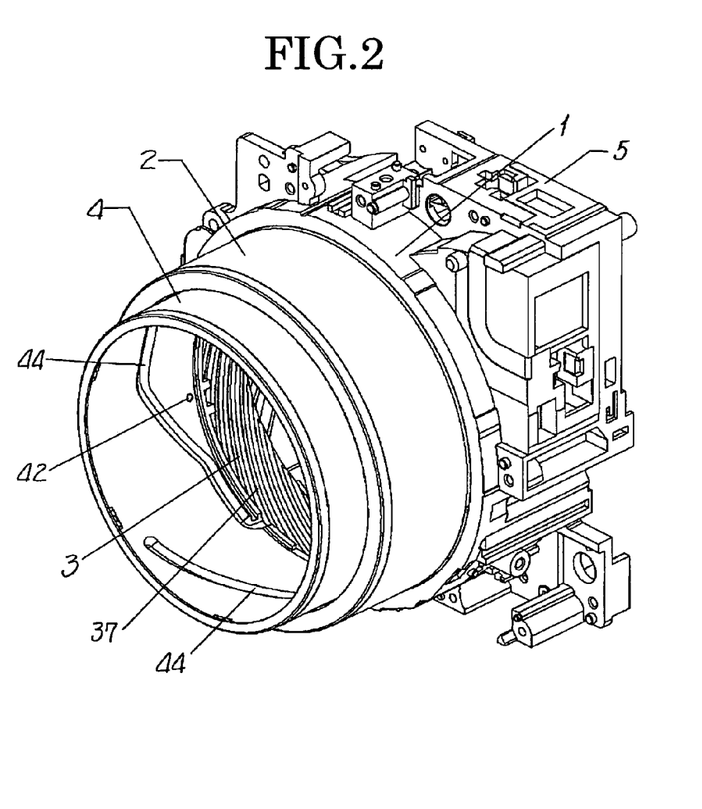
FIG. 2 is a perspective view of a first shooting state of the embodiment described above.

FIG. 1 illustrates the collapsed state where the first rotating cylinder 2, the linear movement cylinder 3 and the second rotating cylinder 4 are retracted and collapsed in the inner circumferential side of the fixed cylinder 1. FIGS. 2 and 4 illustrate a state of having moved to the closest shooting position (for example, wide angle end) from a collapsed position where the first rotating cylinder 2 and the linear movement cylinder 3 are extended from the fixed cylinder 1, and the second rotating cylinder 4 is extended further from the linear movement cylinder 3. FIG. 3 illustrates a state of having moved to the most distant shooting position (for example, telephoto end) from the collapsed position where the first rotating cylinder 2 and the linear movement cylinder 3 are extended further from the fixed cylinder 1, and the second rotating cylinder 4 is extended further from the linear movement cylinder 3.

A structural characteristic of the present invention is a connecting structure of a rotating cylinder and a linear movement cylinder in the lens barrel as structured above, where the linear movement cylinder moves integrally with this rotating cylinder in the optical axis direction and rotates relatively around the optical axis. Hereinafter, this connecting structure will be explained specifically.

As described above, the first rotating cylinder 2 and the linear movement cylinder 3 are connected by a fitting of the four projections 31, 32, 33, 34 and the groove 25 in the circumferential direction via the four cutouts 21, 22, 23, 24. This connection is performed to insert the four projections 31, 32, 33, 34 described above to the four cutouts 21, 22, 23, 24 described above, rotate relatively the first rotating cylinder 2 to the linear movement cylinder 3 in the anticlockwise direction illustrated in FIGS. 8 to 12, and fit the four projections 31, 32, 33, 34 described above in the groove 25 in the circumferential direction of the first rotating cylinder 2 in an end position of this insert.

FIG. 8 illustrates a state when the four projections 31, 32, 33, 34 described above fit in the four cutouts 21, 22, 23, 24 described above. As illustrated in FIG. 8, the first projection 31 and the second projection 32 of the linear movement cylinder 3 are placed at 180-degree intervals in the circumferential direction, that is, the first projection 31 and the second projection 32 are placed in opposite positions from each other across the center axis of the linear movement cylinder 3. The third projection 33 is placed in a position where the center axis of the linear movement cylinder 3 rotates by a smaller angle than 90 degrees in the anticlockwise direction to a position where the first projection 31 is placed. An angle between the first projection 31 and the third projection 33 to the center axis of the linear movement cylinder 3 is taken as an angle A. The fourth projection 34 is placed in a position where the center axis of the linear movement cylinder 3 rotates by a smaller angle than the angle A in a clockwise direction to the position where the first projection 31 is placed. In a case where an angle between the second projection 32 and the fourth projection 34 to the center axis of the linear movement cylinder 3 is taken as an angle B, the angle B is larger than the angle A and is approximately 140 degrees.

A width in a circumferential direction, that is, an angle or a length between a center axis of a cylinder and both ends of an objective part (for example, a projection, a groove and so on) in a cross-section of the cylinder, of the first projection 31 and the second projection 32, is larger than a width in the circumferential direction of the third projection 33 and the fourth projection 34. As an embodiment illustrated, if the first projection 31 and the second projection 32 are formed so as not to be overlapped with the through-hole 36 in the optical axis direction, for example, the first projection 31 and the second projection 32 are formed in the circumferential direction at 180-degree intervals, the strength against shock when dropping and so on is enhanced. Here, for example, the width in the circumferential direction of the first projection 31 and the second projection 32 is approximately 30 degrees. However, it is difficult to retain a degree of parallelization of the first rotating cylinder 2 and the linear movement cylinder 3 to each other if there are only two projections of the first and second projections 31, 32. Therefore, in addition to the first and second projections 31, 32 described above, for example, it is considered that the third projection 33 is shifted by 90 degrees in the circumferential direction to the first projection 31 and the fourth projection 34 is shifted by 90 degrees in the circumferential direction to the second projection 32. In this case, for example, in a case where the first rotating cylinder 2 rotates 90 degrees to the linear movement cylinder 3, the third and fourth projections 33, 34 with a small width face the cutouts which engage with the first and second projections 31, 32 with a large width, and a fitting of the first rotating cylinder 2 and the linear movement cylinder 3 becomes loose.

In an embodiment of the present invention, firstly, the first projection 31 and the second projection 32 placed in the linear movement cylinder 3 are formed in the circumferential direction at 180-degree intervals, and each width in the circumferential direction of these projections 31, 32 is comparatively widened, so that sufficient strength against shock when dropping and so on is ensured. Additionally, the third and fourth projections 33, 34 with a smaller width than that of the first and second projections 31, 32 are placed, and the third projection 33 is placed in a position having the angle A which is smaller than 90 degrees from the first projection 31. In FIG. 8, the fourth projection 34 is placed in a position having the angle B from the second projection 32 in the anticlockwise direction. Here, the angle A and the angle B have a relationship of A>180 degrees-B. Accordingly, if one of the third and fourth projections 33, 34 faces one of the first and second cutouts 21, 22 with the large width corresponding to the first and second projections 31, 32, the other one of the third and fourth projections 33, 34 does not face any of the cutouts. Therefore, a fitting of the projections and cutouts does not come off and the Bayonet connection is constantly stably-retained.

FIG. 8 illustrates a relationship of a relative position of the first rotating cylinder 2 and the linear movement cylinder 3 at an assembling stage of the lens barrel according to the embodiment of the present invention. At this assembling stage, the four projections 31, 32, 33, 34 of the linear movement cylinder 3 are respectively inserted in the four cutouts 21, 22, 23, 24 of the first rotating cylinder 2. A cross-sectional shape and a size of the four cutouts 21, 22, 23, 24 are respectively formed corresponding to a shape and a size of the four projections 31, 32, 33, 34 when looking at the linear movement cylinder 3 from the center axis direction.

Figure 9:
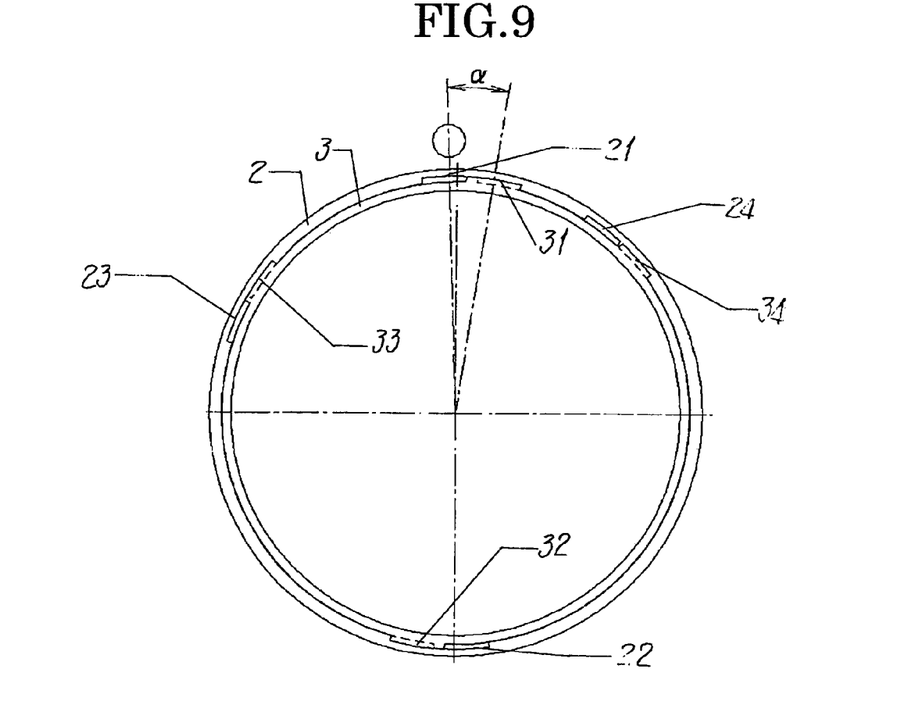
FIG. 9 is a front view illustrating a relationship of a relative position of the first rotating cylinder and the linear movement cylinder in the collapsed state moving from the assembling state of the embodiment described above.

When the four projections 31, 32, 33, 34 are inserted to an end of the four cutouts 21, 22, 23, 24, as illustrated in FIG. 9, the first rotating cylinder 2 rotates relatively by only a comparatively small angle (approximately 10 degrees) in the anticlockwise direction, each projection 31, 32, 33, 34 is guided in the groove 25 in the circumferential direction of the first rotating cylinder 2, and the Bayonet connection is performed. A position illustrated in FIG. 9 is an end position of the assembling, and is a collapsed position where each structural member is retracted in the fixed cylinder 1.

Figure 10:
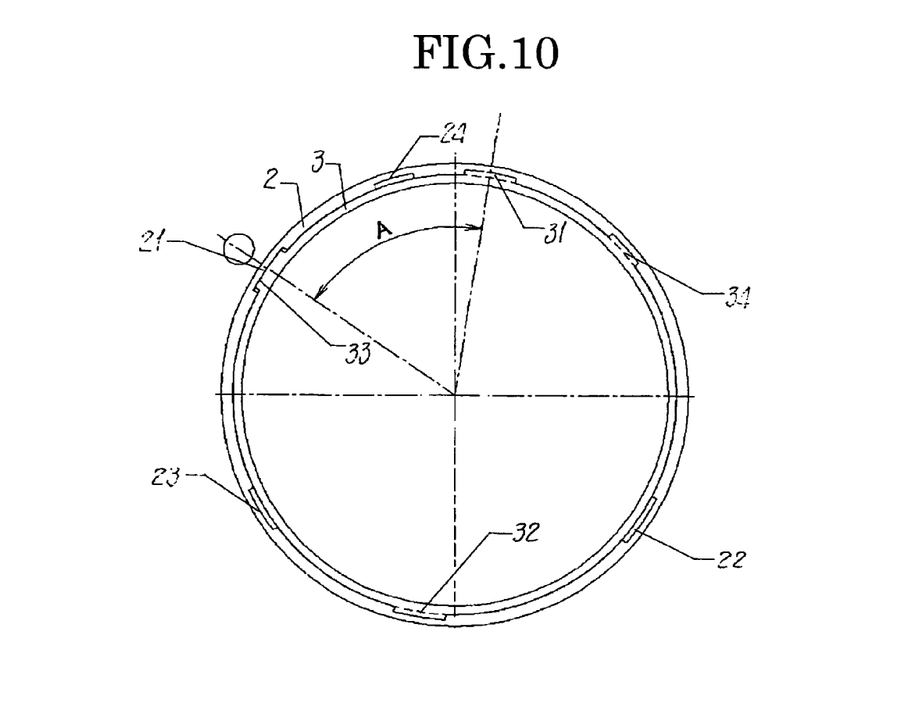
FIG. 10 is a front view illustrating a relationship of a relative position of the first rotating cylinder and the linear movement cylinder in a state of moving from the collapsed state to a shooting state of the embodiment described above.

FIG. 10 illustrates a stage where the first rotating cylinder 2 rotates in the anticlockwise direction and each structural member is extending from the fixed cylinder 1 to be in the shooting position from the collapsed position illustrated in FIG. 9. A rotational angle of the first rotating cylinder 2 is the angle A to the position of the assembling stage illustrated in FIG. 8, and the third projection 33 faces the first cutout 21. A width in the circumferential direction of the third projection 33 is smaller than a width in the circumferential direction of the first cutout 21, however each projection 31, 32, 33, 34 has a relationship of a relative angle position as described above, therefore three projections other than the third projection 33 do not face any cutouts, and the Bayonet connection is stably-retained. A state illustrated in FIG. 10 is a state moving toward the shooting position from the collapsed position, and there is almost no chance for this state to be maintained, and accordingly the third projection 33 does not come off the first cutout 21.

Figure 11:
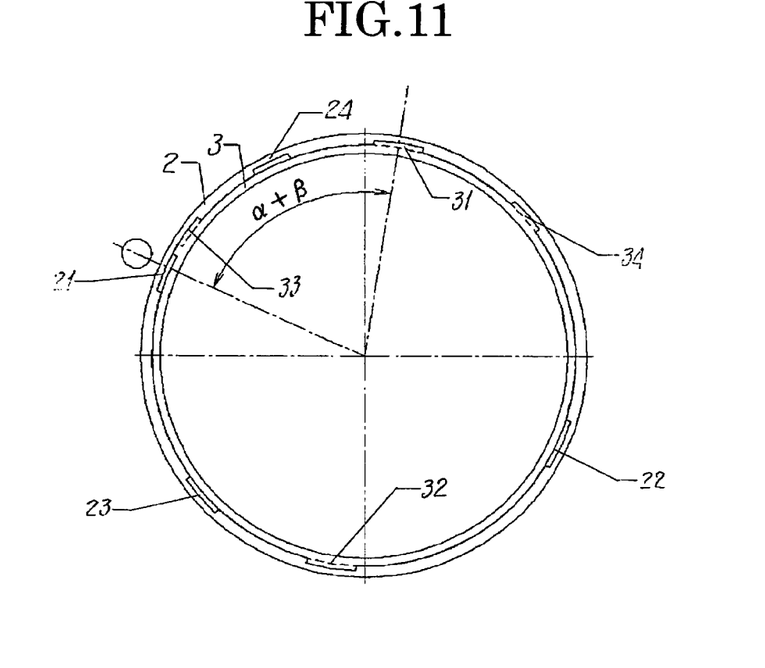
FIG. 11 is a front view illustrating a relationship of a relative position of the first rotating cylinder and the linear movement cylinder in a state where the first rotating cylinder and the linear movement cylinder have moved to the closest shooting position of the embodiment described above.

When the first rotating cylinder 2 rotates in the anticlockwise direction, the state moves from the collapsed position, that is, a retracted position of each structural member, to the closest shooting position illustrated in FIG. 11. In a case where a relative rotational angle of the first rotational cylinder 2 and the linear movement cylinder 3 from the retracted position to the closest shooting position is taken as $\beta$, a rotational angle of the first rotational cylinder 2 from the assembling stage illustrated in FIG. 8 is $\alpha+\beta$. This shooting position, for example, is the wide angle end. A relationship of $\alpha+\beta$ and the angle A described above is $(\alpha+\beta)>A$.

Figure 12:
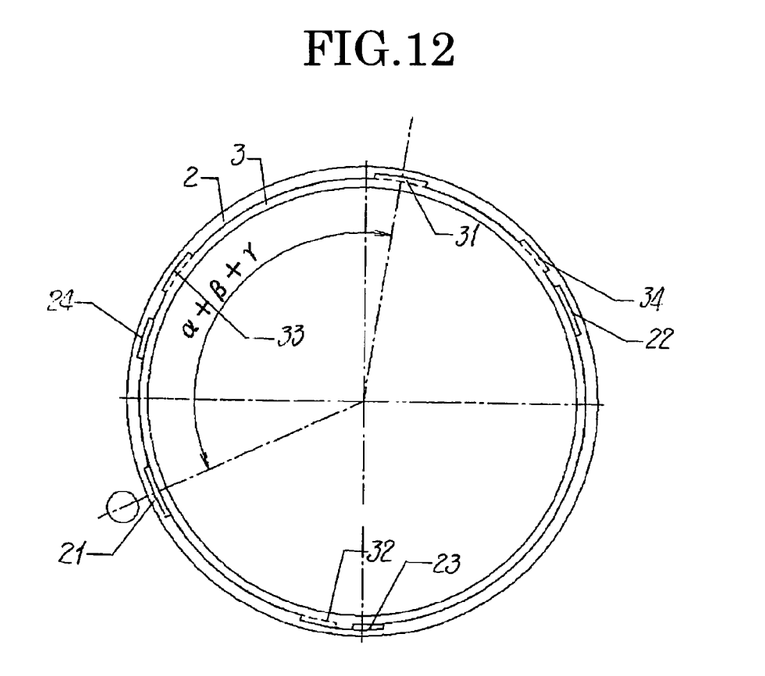
FIG. 12 is a front view illustrating a relationship of a relative position of the first rotating cylinder and the linear movement cylinder in a state where the first rotating cylinder and the linear movement cylinder have moved to the most distant shooting position of the embodiment described above.

When the first rotating cylinder 2 rotates further in the anticlockwise direction, each lens group moves in the optical axis direction corresponding to a rotational angle of the first rotating cylinder 2 at a predetermined rate, and a focal length changes continuously. FIG. 12 illustrates a relative position of the rotating cylinder 2 and the linear movement cylinder 3 when moving from the retracted position to the most distant shooting position, for example, the telephoto end. In a case where a relative rotational angle of the first rotating cylinder 2 and the linear movement cylinder 3 from the closest shooting position to the most distant shooting position is taken as $\gamma$, a rotational angle of the first rotating cylinder 2 from the assembling stage illustrated in FIG. 8 is $\alpha+\beta+\gamma$. A relationship of $\alpha+\beta+\gamma$ and the angle B described above is $(\alpha+\beta+\gamma)<B$.

While moving from a state where the assembling is completed as illustrated in FIG. 9 to the most distant shooting position illustrated in FIG. 12, any one of the four projections 31, 32, 33, 34 may face one of the four cutouts 21, 22, 23, 24, however the other projections do not face the other cutouts, and the Bayonet connection is stably retained.

Figure 13:
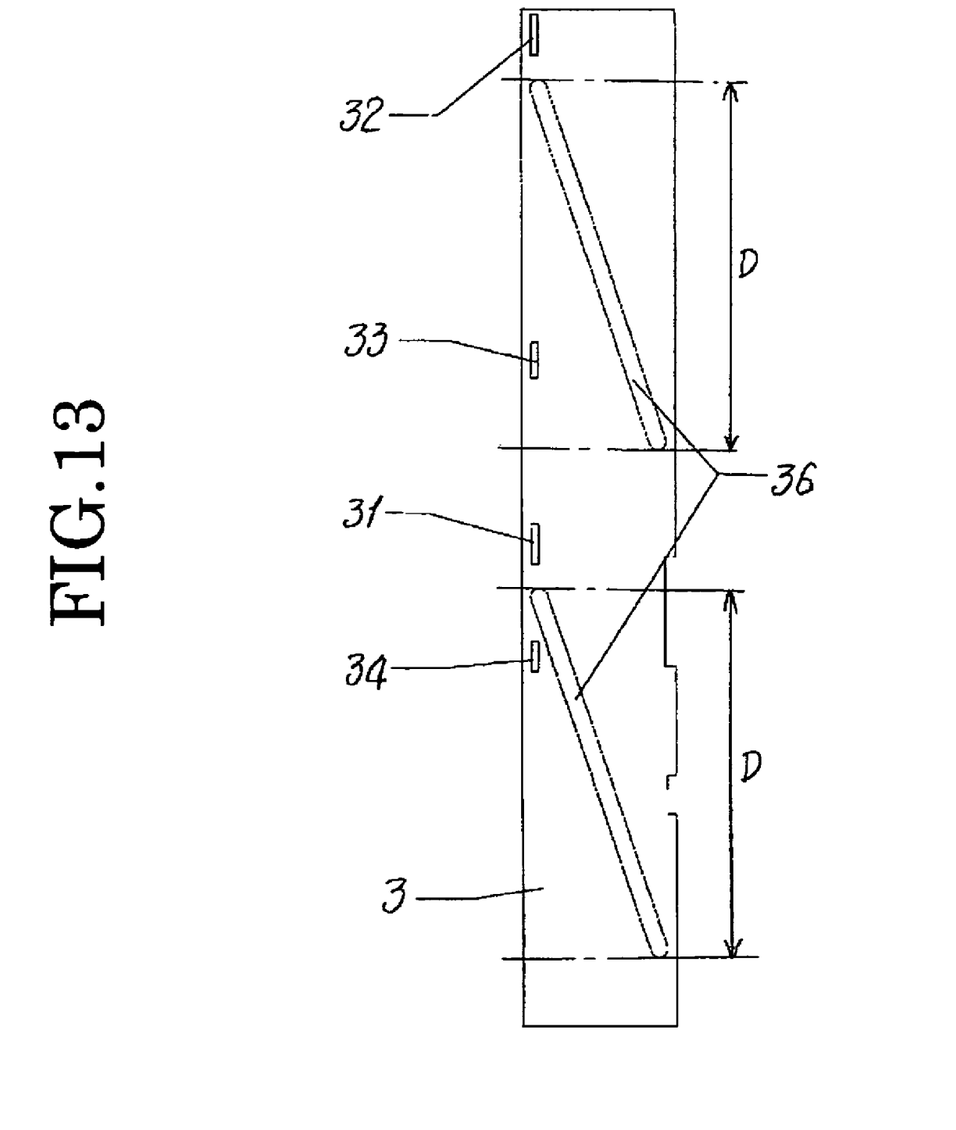
FIG. 13 is a development view illustrating the linear movement cylinder of the embodiment described above.

The first projection 31 and the second projection 32 provided in the linear movement cylinder 3 are, so to speak, main projections, and a positional relationship between these projections 31, 32 and the through-hole 36 formed in the linear movement cylinder 3 has a characteristic of the present invention. FIG. 13 is a development view of the linear movement cylinder 3 which is in the cylindrical shape. And in FIG. 13, areas where the through-holes 36 are provided in the circumferential direction are areas in a circumferential wall corresponding to an angle D, which is described later, when looking at the linear movement cylinder 3 in the circumferential direction. As illustrated in FIG. 13, the linear movement cylinder 3 has two through-holes 36 in the circumferential direction at 180-degree intervals. In a case where an angle of each through-hole 36 in the circumferential direction, that is, in a vertical plane in the optical axis direction, an angle between the center axis and both ends of each through-hole 36 is taken as an angle D, the angle D is smaller than 180 degrees, and here, for example, is approximately 150 degrees, and there are two areas in the circumferential direction where the projections are not overlapped with either one of the two through-holes 36 when looking at the linear movement cylinder 3 in the optical axis direction. In these areas, the first projection 31 and the second projection 32 are respectively placed, and the third and fourth projections 33, 34 are placed in areas of the linear movement cylinder 3 where they are overlapped with the through-holes 36 in the optical axis direction. The first projection 31 and the second projection 32 are provided in areas in the circumferential wall of the linear movement cylinder 3 where the through-holes 36 are not formed in the circumferential direction.

In the linear movement cylinder 3, because of the existence of the through-holes 36, the strength of the areas in which the through-holes 36 are provided in the circumferential direction is degraded. However, as described above, the first projection 31 and the second projection 32 as main projections are formed in the areas where the through-holes 36 are not formed in the circumferential direction, and therefore it is hard to degrade the strength in the vicinity in which the first and second projections 31, 32 are placed. And the first projection 31 and the second projection 32 as main projections are formed in the areas where the through-holes 36 are not formed in the optical axis direction, therefore it is hard to degrade the strength in the vicinity in which the first and second projections 31, 32 are placed. Therefore, even if a shock is applied to the lens barrel being dropped and so on to the first projection 31 and the second projection 32 described above, it is hard for the vicinity of the first projection 31 and the second projection 32 of the linear movement cylinder 3 to be deformed. And it is not necessary to increase a projection amount of the first projection 31 and the second projection 32, because the Bayonet connection does not come off. Therefore, a lens barrel does not need to have a larger diameter.

A width of the third projection 33 is smaller than that of the second projection 32, and a width of the fourth projection 34 is smaller than that of the first projection 31. Therefore, when the third cutout 23 passes a position of the second projection 32 while moving to the most distant shooting position as illustrated in FIG. 12, the third cutout 23 does not come off the second projection 32. Additionally, when the fourth cutout 24 passes a position of the first projection 31 while moving to a position illustrated in FIG. 10, the fourth cutout 24 does not come off the first projection 31, either.

In addition, a width of the fourth projection 34 is smaller than a width of the second projection 32, and a width of the fourth cutout 24 corresponding to the fourth projection 34 is smaller than a width of the second cutout 22 corresponding to the second projection 32, however the second cutout 22 does not move to a position of the fourth projection 34 (see FIG. 12), because of the relationship of $(\alpha+\beta+\gamma)<B$, as described above. Therefore, an engagement of the second cutout 22 and the fourth projection 34 does not come off.

Thus, two projections 31, 32 as the main projections are placed in a high-strength part in the optical axis direction of the linear movement cylinder 3, so that the connecting strength of the first rotating cylinder 2 and the linear movement cylinder 3 is mainly ensured, and the connecting strength is supplementarily ensured by the third and fourth projections 33, 34, and a structure with high strength against shock due to being dropped and so on is achieved. In addition to the first and second projections 31, 32 as the main projections, by providing the third and fourth projections 33, 34, the Bayonet connection of the first rotating cylinder 2 and the linear movement cylinder 3 is stabilized and the front end of the lens barrel slanting downward is decreased.

In the illustrated embodiment, in addition to the first and second projections 31, 32 as the main projections, the third and fourth projections 33, 34 are placed supplementarily, that is, four projections in total and four cutouts corresponding to the four projections are placed. However, in addition to the two main projections, there may be at least one supplemental projection, that is, three projections in total, or there may be equal to or more than four projections in total.

There may be no problem if a height of the projections 31, 32, 33, 34 described above of the linear movement cylinder 3 is respectively different. However, as explained with reference to FIG. 7, if the height of the projections described above is respectively approximately the same, a depth of the cutouts 21, 22, 23, 24 of the first rotating cylinder 2 where the projections described above are inserted in becomes uniform.

Therefore, it is possible to make a thickness of the first rotating cylinder 2 thin, as a result, a size in the radial direction of the entire lens barrel becomes small.

The lens barrel according to the present invention is applicable to a camera, portable data terminal equipment, image input equipment, and so on. The camera comprises a shooting lens, and as a lens barrel of this shooting lens, the lens barrel which has been explained is applicable. The camera according to the present invention has an advantage in that it is hard to be broken even if exposed to a great shock.

There is provided portable data terminal equipment which comprises a camera, such as a PDA, a mobile phone, and so on, and the lens barrel which has been explained is applicable as the shooting lens of the lens barrel of this camera. The portable data terminal equipment according to the present invention has an advantage in that it is hard to be broken even if exposed to a great shock.

There is provided image input equipment which comprises a shooting lens, and converts the image data imaged by the shooting lens into an electric signal and inputs. The lens barrel which has been explained is applicable as the shooting lens of the lens barrel of this image input equipment. The image input equipment according to the present invention has an advantage in that it is hard to be broken even if exposed to a great shock.

In the present invention, equal to or more than three projections of a linear movement cylinder are provided, therefore a first rotating cylinder and the linear movement cylinder perform stably a relative rotation movement in a state of a Bayonet connection. The linear movement cylinder has through-holes to pins provided in a second rotating cylinder throughout a predetermined angle range in a circumferential direction. This is a reason for a degradation of mechanical strength of the linear movement cylinder. However, at least two projections provided in the linear movement cylinder are provided in positions which are not overlapped with the through-holes in an optical axis direction. Accordingly, even if a lens barrel or a camera comprising this lens barrel or the like receives a shock due to dropping and so on, the mechanical strength of the positions where the at least two projections are provided in the linear movement cylinder is maintained. Therefore, a deformation of the positions where the at least two projections are provided is prevented, or even if a deformation occurs, it is kept to a minimum range, the Bayonet connection does not come off, and a normal relative movement of the first rotating cylinder and the linear movement cylinder is ensured.

Although the present invention has been described in terms of exemplary embodiments, it is not limited thereto. It should be appreciated that variations may be made in the embodiments described by persons skilled in the art without departing from the scope of the present invention as defined by the following claims.

The present application is based on and claims priority from Japanese patent application numbers 2007-325957, filed Dec. 18, 2007, and 2008-251520, filed Sep. 29, 2008, the disclosure of which are hereby incorporated by reference herein their entireties.

The invention claimed is:
1. A lens barrel comprising:
a fixed cylinder;
a first rotating cylinder which is placed to be rotatable around an axis to the fixed cylinder;
a linear movement cylinder in a cylindrical shape which is placed in an inner circumferential side of the first rotat- ing cylinder and moves integrally in an axis direction with the first rotating cylinder and rotates relatively around the axis; and a second rotating cylinder which is placed in an inner circumferential side of the linear movement cylinder, wherein the linear movement cylinder has three or more projections which are projected outside in a radius direction in an outer circumferential surface, the first rotating cylinder has three or more cutouts in the inner circumferential surface thereof, the three or more cutouts corresponding to each projection of the linear movement cylinder and a shape of the cutouts corresponding to a shape of each projection, and the three or more cutouts of the first rotating cylinder are respectively formed in parallel with an axis of the first rotating cylinder and in which each projection of the linear movement cylinder is inserted, wherein an end of each cutout in which each projection is inserted is extended to a groove in a circumferential direction, and each projection is guided in this groove in the circumferential direction, and the first rotating cylinder and the linear movement cylinder are connected, wherein the linear movement cylinder has a through-hole to a pin provided in the second rotating cylinder, and wherein at least two of the three or more projections are placed in an area in a circumferential wall of the linear movement cylinder where the through-hole is not formed in the circumferential direction.

2. The lens barrel according to claim 1, wherein the groove in the circumferential direction is formed at a front end of the first rotating cylinder.

3. The lens barrel according to claim 1, wherein a linear movement groove is formed in parallel with the axis in an inner circumferential surface of the fixed cylinder, and the linear movement cylinder has a projection at an back end which is projected toward the outside in a radius direction and fits in the linear movement groove.

4. The lens barrel according to claim 1, wherein a height of each of the three or more projections of the linear movement cylinder is the same.

5. The lens barrel according to claim 1, wherein the lens barrel is a retractable lens barrel, and wherein the first rotating cylinder, the linear movement cylinder, and the second rotating cylinder are collapsed in an inner circumference of the fixed cylinder, and a position, where each projection is guided in the groove in the circumferential direction and the first rotating cylinder and the linear movement cylinder rotate relatively by a predetermined angle, is taken as an assembling position.

6. The lens barrel according to claim 5, wherein a position where the first rotating cylinder and the linear movement cylinder relatively rotate by the predetermined angle from the assembling position is a collapsed position where the first rotating cylinder, the linear movement cylinder, and the second rotating cylinder are collapsed in an inner circumference of the fixed cylinder, and the first rotating cylinder and the linear movement cylinder rotate relatively further, and thereby a position where the first rotating cylinder, the linear movement cylinder, and the second rotating cylinder are extended forward from the fixed cylinder is a shooting position.

7. The lens barrel according to claim 6, wherein the shooting position is continuously changeable in a range of the closest shooting position to the most distant shooting position from the collapsed position by a relative rotation of the first rotating cylinder and the linear movement cylinder.

8. The lens barrel according to claim 7, wherein when a relative rotation angle of the first rotating cylinder and the linear movement cylinder from the assembling position of the first rotating cylinder and the linear movement cylinder to the collapsed position is taken as $\alpha$, a relative rotation angle of the first rotating cylinder and the linear movement cylinder from the collapsed position to the closest shooting position is taken as $\beta$, a relative rotation angle of the first rotating cylinder and the linear movement cylinder from the closest shooting position to the most distant shooting position is taken as $\gamma$, a first projection and a second projection of the three or more projections are placed in the circumferential direction at 180 degrees, a third projection having a smaller width in the circumferential direction than those of the first projection and the second projection of the three or more projections is placed in a position which is shifted by an angle which is less than $\alpha+\beta$ degrees from the first projection in a rotational direction of the first rotating cylinder.

9. The lens barrel according to claim 8, wherein a fourth projection having a smaller width in the circumferential direction than that of the first projection is placed in a position which is shifted by an angle which is equal to or more than $\alpha+\beta+\gamma$ degrees from the second projection in the rotational direction of the first rotating cylinder.

10. The lens barrel according to claim 1, wherein the pin provided in the second rotating cylinder penetrates the through-hole provided in the linear movement cylinder, engages with a linear movement groove formed in the inner circumference of the first rotating cylinder, and transmits a torque of the first rotating cylinder to the second rotating cylinder.

11. A camera comprising:
a shooting lens, wherein a lens barrel of the shooting lens is the lens barrel according to claim 1.

12. Portable data terminal equipment comprising:
a camera, wherein a lens barrel of the shooting lens of the camera is the lens barrel according to claim 1.

13. Image input equipment comprising:
a shooting lens, which converts the image data imaged by the shooting lens into an electric signal and inputs, wherein a lens barrel of the shooting lens is the lens barrel according to claim 1.

14. A cylinder for a lens barrel structured by fitting in a first circular cylinder, the cylinder comprising:
three or more projections which are projected toward the outside in a radius direction in an outer circumferential surface; and
a through-hole to a pin provided in a second cylinder, and at least two projections of the three or more projections are placed in an area in a circumferential wall of the cylinder for the lens barrel where the through-hole is not formed in a circumferential direction.

15. The cylinder for the lens barrel according to claim 14, wherein the projections are formed at a front end of the cylinder for the lens barrel and the cylinder for the lens barrel has an additional projection at a back end in the outer circumferential surface which is projected toward the outside in a radius direction and fits in a groove formed in a third cylinder.

* * * * *